United States Patent
Harasaki

(10) Patent No.: US 9,845,192 B2
(45) Date of Patent: Dec. 19, 2017

(54) TRANSPORT VEHICLE SYSTEM AND TRANSPORT METHOD

(71) Applicant: MURATA MACHINERY, LTD., Kyoto-shi, Kyoto (JP)

(72) Inventor: Kazumi Harasaki, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 15/308,616

(22) PCT Filed: Apr. 21, 2015

(86) PCT No.: PCT/JP2015/062071
§ 371 (c)(1),
(2) Date: Nov. 3, 2016

(87) PCT Pub. No.: WO2015/186444
PCT Pub. Date: Dec. 10, 2015

(65) Prior Publication Data
US 2017/0137219 A1    May 18, 2017

(30) Foreign Application Priority Data

Jun. 4, 2014 (JP) ................................. 2014-115483

(51) Int. Cl.
*B65G 1/04* (2006.01)
*G05D 1/02* (2006.01)

(52) U.S. Cl.
CPC .................... *B65G 1/04* (2013.01); *G05D 1/02* (2013.01)

(58) Field of Classification Search
USPC ......................................................... 700/214
See application file for complete search history.

(56) References Cited

U.S. PATENT DOCUMENTS

| 2008/0147306 A1* | 6/2008 | Hayashi | G05D 1/0289 701/117 |
| 2011/0178657 A1* | 7/2011 | Harasaki | G05D 1/0272 701/2 |
| 2013/0211626 A1* | 8/2013 | Nagasawa | G05D 1/0027 701/2 |

FOREIGN PATENT DOCUMENTS

| JP | 2002-189520 A | 7/2002 |
| JP | 5309814 B2 | 10/2013 |

* cited by examiner

*Primary Examiner* — Kyle O Logan
(74) *Attorney, Agent, or Firm* — Keating & Bennett, LLP

(57) ABSTRACT

In a transport vehicle system, when a first transport vehicle passes through a predetermined point, a controller determines whether picking up an article at a high-priority transfer point would slow down or stop other transport vehicles, which pick up articles at transfer points on a downstream side, according to states of the other transport vehicles. If the other transport vehicles would be slowed down or stopped, a command is issued to the first transport vehicle to pick up the article at the transfer point on the downstream side. If the other transport vehicles will not be slowed down or stopped, a command is issued to the first transport vehicle to pick up the article at the high-priority transfer point.

9 Claims, 3 Drawing Sheets

TRANSPORT VEHICLE SYSTEM AND TRANSPORT METHOD

BACKGROUND OF THE INVENTION

1. Field of the Invention

The present invention relates to a transport vehicle system such as an overhead travelling vehicle system and an unattended transport vehicle system and a transport method.

2. Description of the Related Art

There is known a transport vehicle system that includes at least one circulating route, a plurality of transport vehicles that travel in one direction along the circulating route, a transfer point placed along the circulating route where an article is transferred between the plurality of transport vehicles, and a transport vehicle controller that controls the travel of the plurality of transport vehicles. In addition, it is known that priority is assigned to a transport command and the transport command is executed from a higher priority, as disclosed in (JP2002-189520A). Transporting the article starts with picking up from the transfer point and ends with dropping off at the transfer point, so that priority of the transport command also means priority of pick-up from the transfer point. It is also known that pick-up is carried out in order from the transfer point on the downstream side when pick-ups are requested from a plurality of transfer points within the same circulating route, as disclosed in (JP5309814B).

However, there has not been a technology established which enables a balance in control focusing on priority and control focusing on the transfer point on the downstream side. If priority is focused on, the transport vehicle stops at the transfer point on the upstream side, resulting in an issue being created where the subsequent transport vehicles are prevented from picking up articles at the transfer points on the downstream side. Additionally, if priority is placed on pick-up on the downstream side, it creates an issue where the transport command with higher priority cannot be executed straight away.

SUMMARY OF THE INVENTION

Preferred embodiments of the present invention enable a balance of placing priority on a transport command and preventing congestion by prioritizing pick-up on a downstream side.

According to a preferred embodiment of the present invention, a transport vehicle system includes at least one circulating route; a plurality of transport vehicles that travel in one direction along the circulating route; a plurality of transfer points along the circulating route where an article is transferred between the plurality of transport vehicles; and a transport vehicle controller that controls the travel of the plurality of transport vehicles. When requests are made for picking up articles from the plurality of transfer points within the same circulating route, and the priority is specified for each pick-up, the transport vehicle controller is configured or programmed to: assign commands to the plurality of transport vehicles to travel to a predetermined point on the upstream side of the plurality of transfer points according to the number of transfer points where the articles are picked up; when a first transport vehicle included in the plurality of transport vehicles passes through the predetermined point, determine whether or not picking up the article at a high-priority transfer point by the first transport vehicle will slow down or stop other transport vehicles included in the plurality of transport vehicles which pick up the articles at the transfer points on the downstream side according to the states of the other transport vehicles included in the plurality of transport vehicles; issue a command to the first transport vehicle to travel to the transfer point on the downstream side and pick up the article if the other transport vehicles would be slowed down or stopped; and issue a command to the first transport vehicle to travel to the high-priority transfer point and pick up the article if the other transport vehicles will not be slowed down or stopped.

According to another preferred embodiment of the present invention, a transport method is performed by a transport vehicle system including at least one circulating route; a plurality of transport vehicles that travel in one direction along the circulating route; a plurality of transfer points placed along the circulating route where an article is transferred between the plurality of transport vehicles; and a transport vehicle controller that controls the travel of the plurality of transport vehicles. When requests are made for picking up articles from the plurality of transfer points within the same circulating route, and the priority is specified for each pick-up, the transport vehicle controller performs the steps including: assigning commands to the plurality of transport vehicles to travel to a predetermined point on the upstream side of the plurality of transfer points according to the number of transfer points from which the articles are to be picked up; when a first transport vehicle among the plurality of transport vehicles passes through the predetermined point, determining whether or not picking up the article at a high-priority transfer point by the first transport vehicle would slow down or stop other transport vehicles included in the plurality of transport vehicles which pick up the articles at the transfer points on the downstream side according to the states of the other transport vehicles among the plurality of transport vehicles; issuing a command to the first transport vehicle to travel to the transfer point on the downstream side and pick up the article if the other transport vehicles would be slowed down or stopped; and issuing a command to the first transport vehicle to travel to the high-priority transfer point and pick up the article if the other transport vehicles will not be slowed down or stopped.

In a preferred embodiment of the present invention, it is determined whether or not picking up the article at the high-priority transfer point on the upstream side would affect or prevent pick-up at the transfer point on the downstream side. According to this determination result, a transfer point where the article is to be picked up is commanded. If it does not affect or prevent the pick-up at the transfer point on the downstream side, the article can be picked up by focusing on the priority. If it affects or prevents the pick-up, the article at the transfer point on the downstream side is picked up first, so that pick-up at the high-priority transfer point by other transport vehicles is not affected or prevented. In such a situation, the other transport vehicles should also be able to arrive and pick up the article at the high-priority transfer point in a short waiting time, and thus a plurality of transport vehicles may be able to pick up the articles at the same time.

The time at which first transport vehicle passes through the predetermined point can be determined at a time before the first transport vehicle passes through the predetermined point or within a predetermined allowable time after having passed through the point. The predetermined point is, for example, a point on the upstream side of the plurality of transfer points within the circulating route that includes the plurality of transfer points from which the articles are being picked up. The point also refers to a position on the circulating route. Thus, in both cases of affecting or preventing and not affecting or preventing the pick-up, a preferred embodiment of the present invention enables efficient transport of the articles. While the priority on the transport command is generally followed, a preferred embodiment of the present invention is able to reduce or prevent situations in which the other transport vehicles are slowed down or stopped, and thus, forced to wait.

Additionally, a preferred embodiment of the present invention enables a balance of focusing on the priority of the transport command and preventing congestion thorough prioritizing pick-up on the downstream side, thus being able to implement the control for harmonizing both functions as a standard control. If JP2002-189520A and JP5309814B are used as disclosed therein, either focusing on the priority or picking up the article on the downstream side is required to be selected, such that both functions are not realized together.

The description of the preferred embodiments of the transport system included herein is applicable to the preferred embodiments of the transport method herein, and the description of the preferred embodiments of the transport method included herein is also applicable to the preferred embodiments of the transport system.

Preferably, the transport vehicle controller is configured or programmed to determine whether or not the other transport vehicles would be slowed down or stopped based on the speed of the other transport vehicles among the plurality of transport vehicles. For example, if the other transport vehicles would be stopped or the vehicles would be travelling at a low speed exceeding a predetermined ratio of the upper limit speed that is decided according to the position on the circulating route, there is a high possibility of the other transport vehicles experiencing congestion such that they will likely be delayed in arriving at the transfer point on the downstream side.

Preferably, the transport vehicle controller is configured or programmed to determine whether or not the other transport vehicles are slowed down or stopped based on the position of the other transport vehicles among the plurality of transport vehicles. Once the position of the other transport vehicles are identified, the arrival time of the other transport vehicles is preferably determined based on the standard time required to travel from the position to the predetermined point or the distance from the position to the predetermined point. The arrival time of the other transport vehicles can preferably be determined by combining the position and the speed of the other transport vehicles.

Preferably, the transport vehicle is an overhead travelling vehicle and travels according to a command issued by the transport vehicle controller. The at least one circulating route is preferably provided underneath a ceiling of a building and includes a plurality of circulating routes including an inter-bay route and a plurality of intra-bay routes connected to the inter-bay route. The transport vehicle and the transport vehicle controller are configured or programmed such that the transport vehicle picks up the article from the designated transfer point according to the command issued by the transport vehicle controller and then travels from the intra-bay route which includes the transfer point from which the article is picked up, to the intra-bay route which includes a transfer point to which the article is dropped off, via the inter-bay route. Thus, the article is able to be efficiently transported in the overhead travelling vehicle system.

Preferably, the predetermined point is provided at the entrance to the intra-bay route that is included in the same circulating route as the inter-bay route. A station where the article is to be picked up is designated at the entrance to the intra-bay route on which a plurality of pick-up stations are located, so that a precise command is able to be given compared to the case in which the station is designated further on the upstream side. In addition, by providing the predetermined station at the entrance within the intra-bay route, congestion when moving from the inter-bay route to the intra-bay route is significantly reduced or prevented.

Preferably, the transport vehicle controller is configured or programmed to issue a command without stopping or slowing down the first transport vehicle, when the first transport vehicle passes through the predetermined point. This is achieved by giving a notice of a pick-up station where the article is to be picked up before passing through the predetermined point, thus enabling the first transport vehicle to travel more efficiently.

Preferably, the transport vehicle controller is configured or programmed to designate a transfer point where the article is to be picked up and issue a command to travel to the designated transfer point when the other transport vehicles pass through the predetermined point. By making the transfer point where the article is to be picked up changeable until the other transport vehicles pass through the predetermined point, flexible actions are able to be taken according to changes in circumstances.

Preferably, when a request for picking up the article is made from a new transfer point within the same circulating route by specifying the priority after having issued a command of a transfer point where the article is to be picked up to the first transport vehicle, the transport vehicle controller is configured or programmed to: assign a command to a new transport vehicle to travel to the predetermined point; for a group of transfer points which include transfer points within the same circulating route where requests for picking up the articles are made and the new transfer point, and a group of transport vehicles which include the other transport vehicles and the new transport vehicle, when the first transport vehicle in the group of transport vehicles passes through the predetermined point, determine whether or not picking up the article at a high-priority transfer point in the group of transfer points by the first transport vehicle in the group of transport vehicles would slow down or stop the other transport vehicles in the group of transport vehicles that pick up the articles at the transfer points on the downstream side according to the states of the other transport vehicles in the group of transport vehicles; issue a command to the first transport vehicle in the group of transport vehicles to travel to the transfer point on the downstream side and pick up the article if the other transport vehicles would be slowed down or stopped; and issue a command to the first transport vehicle in the group of transport vehicles to travel to the high-priority transfer point in the group of transfer points and pick up the article if the other transport vehicles will not be slowed down or stopped.

In this case, the transfer points within the same circulating route, where requests for picking up the articles are made, are regarded as the group of transfer points, and the transport vehicles, which are intended for picking up the articles at any of these transfer points, are regarded as the group of transport vehicles. The groups are repeatedly rearranged when a request for picking up the article is made by specifying the priority and when the transport vehicle passes through the predetermined point. Moreover, when the transport vehicle passes through the predetermined point, the most efficient transfer point within the group, where the transport vehicle picks up the article, is determined and then the transfer point where the article is to be picked up is designated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described hereinafter.

Figure 1:
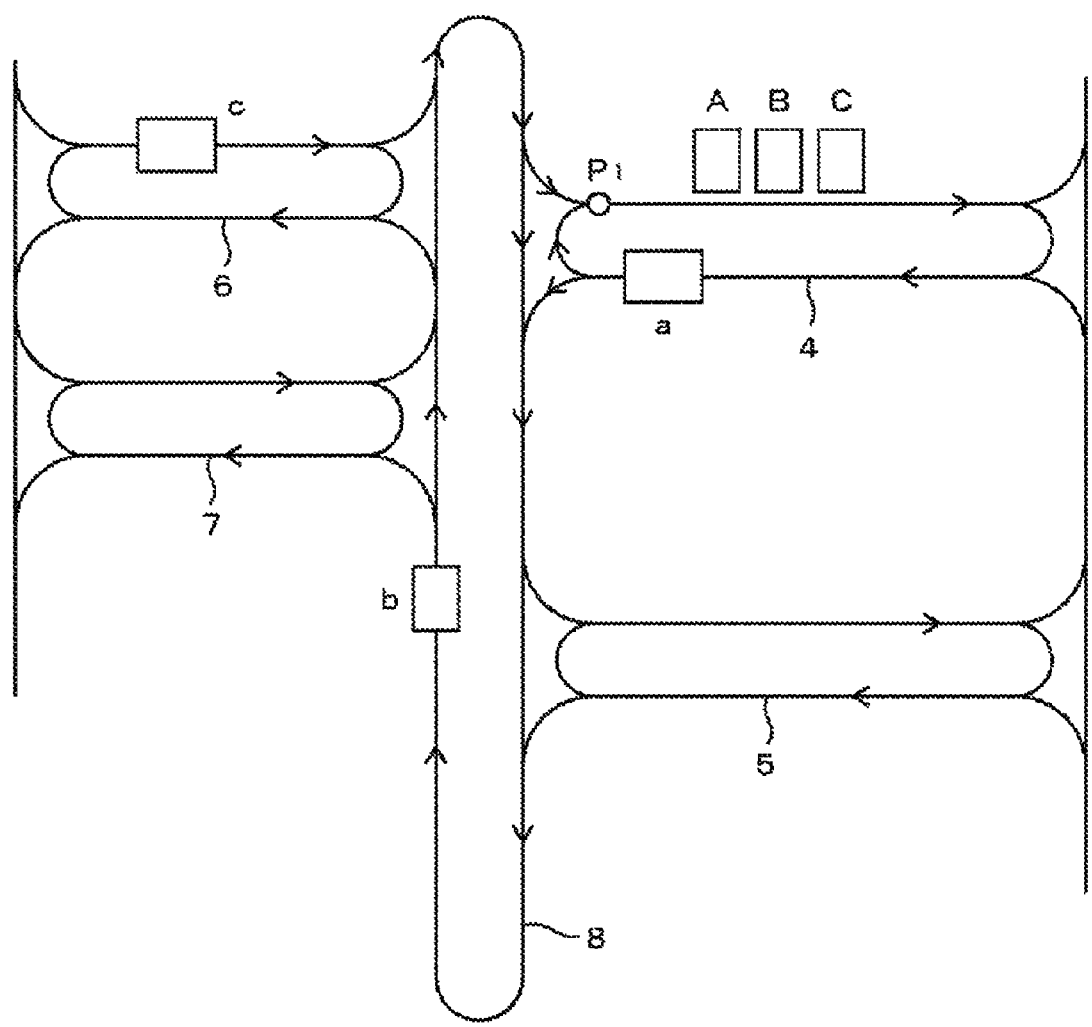
FIG. 1 is a diagram illustrating a layout of a transport vehicle system according to a preferred embodiment of the present invention.
Figure 2:
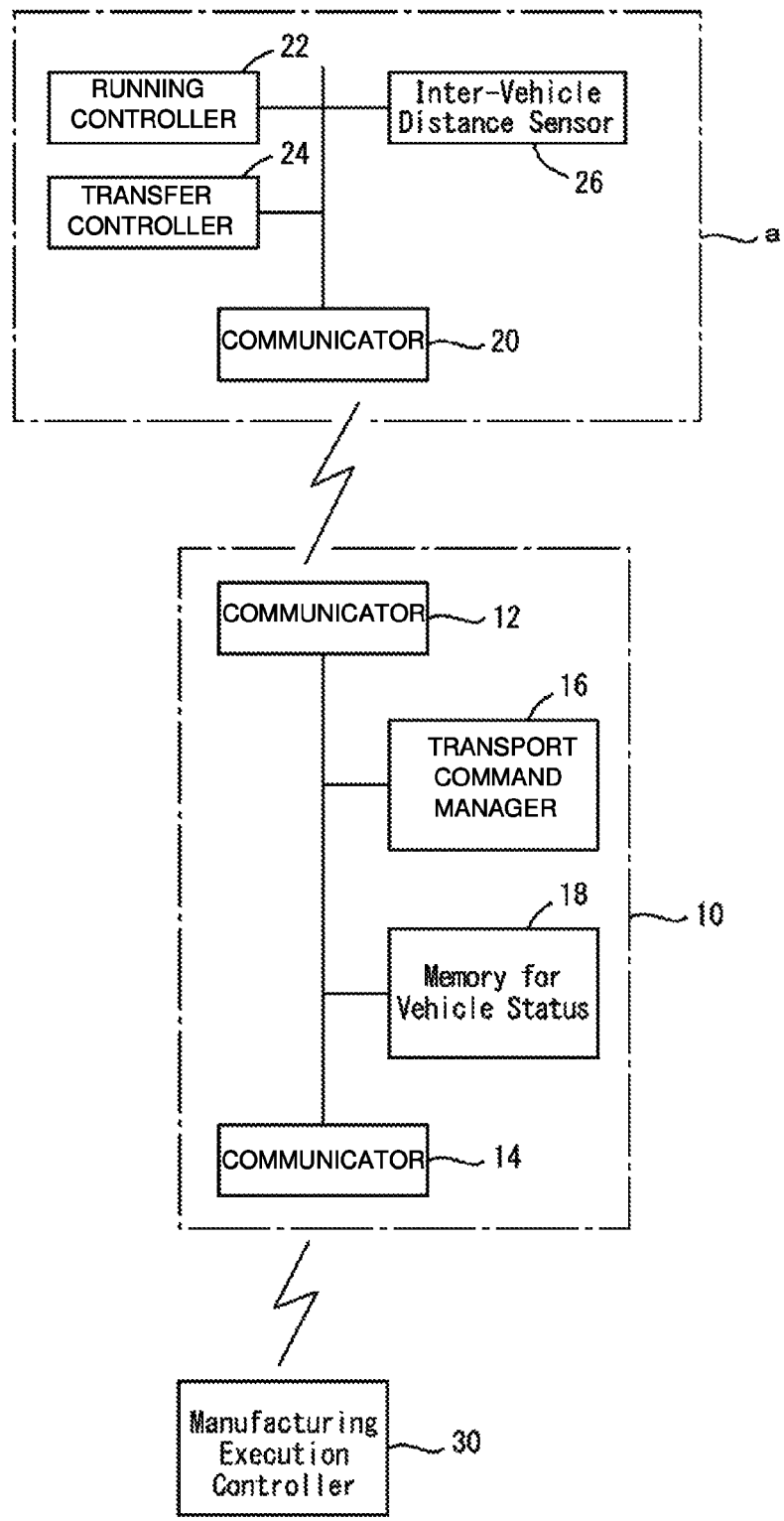
FIG. 2 is a block diagram illustrating a transport vehicle controller and a transport vehicle according to a preferred embodiment of the present invention.
Figure 3:
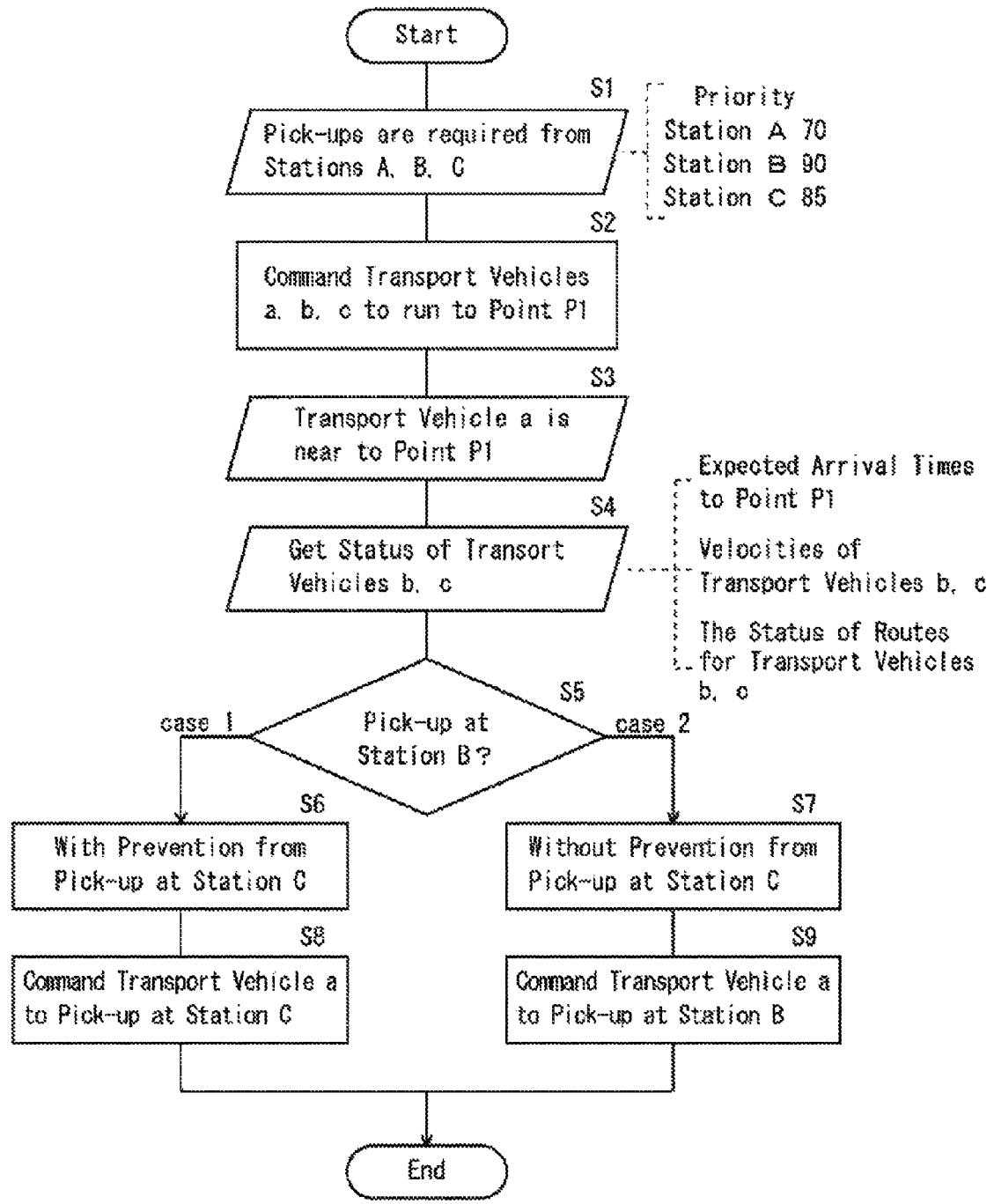
FIG. 3 is a flowchart showing a transport algorithm according to a preferred embodiment of the present invention.

FIGS. 1-3 show preferred embodiments of the present invention. In FIG. 1, 2 is a travelling route, a plurality of circulating routes are connected to each other to define the travelling route 2 of a transport vehicle, and the transport vehicle preferably travels along each circulating route in one direction as indicated with arrows. 4 to 7 are intra-bay routes, 8 is an inter-bay route and both the intra-bay routes and the inter-bay route preferably are circulating routes, for example. In addition, 10 is a transport vehicle controller that controls the transport vehicle. A number of transport vehicles travel along the travelling route 2, and each transport vehicle picks up or drops off an article by using a station, a buffer, a stocker, or the like. The transport vehicle refers to, for example, an overhead travelling vehicle or an unattended transport vehicle, for example. The travelling route 2 is preferably provided in a ceiling space of a building, for example.

In a preferred embodiment of the present invention, picking up articles is requested from the stations A, B, C in the order from the upstream to the downstream of the intra-bay route 4, for example. Here, as an example, the priority of picking up the article from the station A is 70, the priority is 90 for the station B, and the priority is 85 for the station C. In this example, a maximum value of the priority is 99, and a higher value indicates prioritized pick-up is desired or required. In order to pick up the articles from the stations A, B, C, the transport vehicle controller 10 designates the transport vehicles a, b, c, issues a command to travel to a call-in point P1 on the upstream side of the stations A, B, C, and causes the vehicles to travel. Preferably, a destination to which the transport vehicles will travel after passing through the call-in point P1 is determined by the time the transport vehicles a, b, c arrive at the call-in point P1. The call-in point (hereinafter simply referred to as a point) is a point on the upstream side of the station where the article is picked up (hereinafter simply referred to as a pick-up point) or the like, and it is a point near the entrance of the circulating route (e.g., the intra-bay route 4) that includes the pick-up point. In the present preferred embodiment, the call-in point P1 is preferably provided near or at the entrance to the intra-bay route 4 from the inter-bay route 8, and is preferably within the intra-bay route 4.

Based on the priority in this example, pick-up should be first carried out at the station B. However, in order to reduce or prevent congestion, a case in which pick-up at the station B becomes the cause of stopping or slowing down the subsequent transport vehicles should be avoided. Additionally, transporting at the stations B and C at the same or substantially the same time is the most efficient way. Therefore, the transport vehicle is configured to report its current position and speed to the transport vehicle controller 10 at the time it reaches a predetermined position on an upstream side of the point P1 (for example, at the time when the transport vehicle reaches the position at which it will arrive at the point P1 within approximately a second). In FIG. 1, the transport vehicle preferably reports to the transport controller 10 at the time when it reaches a position immediately upstream of the point P1.

Once the transport vehicle controller 10 receives this report, it requests other transport vehicles b, c, which are planned to be designated to pick up articles at the stations A, B, C, to report, for example, their current position, speed, and status. The status includes, for example, detecting a vehicle travelling ahead by an inter-vehicle distance sensor and if the transport vehicles is being influenced by congestion. As for the speed, an instantaneous speed or average speed of the past predetermined times may be reported, for example. The transport vehicle controller 10 determines whether pick-up at the station B will cause congestion for the transport vehicles b, c based on the position, speed, and status of the transport vehicles b, c. To make such a determination, the position, speed, and state may all be used, or partial information such as only position, position, and speed or only status may be used.

For example, the distances from the current positions of the transport vehicles b, c to the station C are divided by the average travel speed or the like, such that the required times for reaching the station C can be predicted. If this predicted time is longer than the time until the transport vehicle a departs after having completed pick-up at the station B, it can be concluded that the pick-up at the station B will not be the cause of congestion. In addition, if the speeds of the transport vehicles b, c are lower than a predetermined ratio of the normal speed, it can be determined that the transport vehicles b, c are experiencing congestion. Similarly, for example, when the inter-vehicle distance sensor is detecting the transport vehicle travelling ahead (on the downstream side) or the inter-vehicle distance sensor is detecting the transport vehicle travelling ahead and the speed is being reduced, it can be concluded that the transport vehicle is experiencing congestion. The transport vehicle experiencing congestion is delayed in arriving at the station C, so that even if the transport vehicle a picks up the article at the station B, it can be concluded that it will not be affected.

Before the transport vehicle a passes through the point P1, the transport vehicle controller 10, according to the determination made above, issues a command indicating from which station the transport vehicle a should pick up the article. Issuing a command before passing through the point P1 allows a command to be issued to the transport vehicle a without causing the transport vehicle a to slow down or stop in order to wait for the command. Thus, if pick-up at the station B by the transport vehicle a does not affect the travel of the transport vehicles b, c, the article is picked up from the high-priority station B. If pick-up at the station B by the transport vehicle a does affect the travel of the transport vehicles b, c, the article can be picked up from the station C on the downstream side. When the transport vehicle a picks up the article at the station C, it also becomes possible for the transport vehicle b or the like to pick up the article at the station B at the same time or substantially the same time that the transport vehicle a picks up an article at the station C. Transporting the article according to the priority within a short waiting time is considered to be a high transporting efficiency. In the present preferred embodiment, the high transporting efficiency based on such a criteria is obtained.

The same processing of the transport vehicle a is performed for the remaining transport vehicles b, c and the remaining transfer stations. That is, with those stations as targets excluding the station designated for the transport vehicle a from among the stations A, B and C, the stations where pick-ups should be carried out are designated before the vehicles pass through the call-in point P1.

The following describes the processing performed in the case when a new pick-up request for which the priority is specified arises on the same intra-bay route 4 before designating the stations from which the transport vehicles b, c pick up the articles is finished. A new station that is requesting the article to be picked up (not illustrated) is regarded as D, transfer stations where commands to pick up the articles have not yet been assigned are regarded as, for example, A, B, and a transport vehicle that is newly designated (not illustrated) is regarded as d.

The stations A, B, D that require pick-ups, but for which the commands have not yet been assigned, are defined as a group of transfer stations. The transport vehicles b, c, d that have commenced the travel to the aforementioned stations are defined as a group of transport vehicles. The same processing as mentioned above is performed for the groups of the transfer stations and the transport vehicles. That is, each time a pick-up request with the priority specified arises within the same intra-bay route, the station is added to the group of transfer stations, a command to travel to the call-in point P1 is issued to a new transport vehicle, and the vehicle is added to the group of transport vehicles. In addition, once the station from which the article is to be picked up from is decided when the transport vehicle passes through the call-in point P1, the transport vehicle and the assigned station are removed from the groups of transfer stations and transport vehicles, respectively. Thus, it is possible to continue to issue a command of the optimum pick-up point.

The configurations of the transport vehicles a, b, c, or the like and the transport vehicle controller 10 are illustrated in FIG. 2. The transport vehicle controller 10 communicates with a communicator 20 of the transport vehicles a, b, c, or the like via a communicator 12 and communicates with a manufacturing execution controller 30 (a controller which requests the transport vehicle controller 10 to transport the article) via a communicator 14. A transport command manager 16 in the transport vehicle controller 10 generates a transport command, assigns the command, and manages the implementation state. The transport command also includes, for example, travelling to the point P1, and travelling from the point P1 to the pick-up stations A, B, C, or the like. A memory for vehicle status 18 in the transport vehicle controller 10 stores position, speed, and status such as unloaded/loaded state and detecting the vehicle travelling ahead by the inter-vehicle distance sensor for each transport vehicle a, b, c, or the like.

For example, the transport vehicle a controls a running monitor or the like by a running controller 22 and controls elevating/lowering a lifting platform or the like by a transfer controller 24. In addition, when the inter-vehicle distance sensor 26 detects the transport vehicle travelling ahead within the speed reduction range, the transport vehicle a slows down or stops. The communicator 20, the running controller 22, and the transfer controller 24 include computers and are programmed to realize functions of the present preferred embodiment of the present invention.

It is possible to assign a command to travel to the point P1 to pick up the articles at the stations A, B, C and make inquiries to other transport vehicles about the position, speed, status or the like upon receiving a report immediately before the transport vehicle reaches the point P1. Based on the position, speed, and status of the other transport vehicles, it can be selected whether the article is picked up at the station B or the station C.

FIG. 3 shows a non-limiting example of a processing algorithm for the present preferred embodiment of the present invention. In step S1, pick-ups are required from the stations A, B, C, and the priority is 70 for the station A located on the upstream side, 90 for the station B located at the intermediate position, and 85 for the station C located on the downstream side. In step S2, a command to travel to the point P1 is assigned to three transport vehicles a, b, c, and the vehicles are caused to travel. In step S3, the first transport vehicle a approaches the point P1. In step S4, the states such as position, speed, and status of the transport vehicles b, c are obtained.

In steps S5 to S7, whether or not pick-up at the station B will affect or prevent pick-up at the station C (e.g., whether the transport vehicle travelling towards the station C will be slowed down or stopped) is determined. If it will not affect or prevent pick-up at the station C, the article is picked up at the station B (step S9). If it will affect or prevent the pick-up at the station C, the article is picked up at the station C (step S8). This enables a balance of focusing on the priority and preventing congestion, thus enabling efficient transport.

The present preferred embodiment of the present invention preferably takes into account interference among the transport vehicles that pick up the articles at the stations A, B, C. However, the scope may be broadened so as to determine whether or not pick-up at the station B will interfere with all other transport vehicles that pass through the station B. The transport vehicle controller 10 stores destinations which it has commanded the transport vehicles to travel to, so that it can search the transport vehicles which need to be inquired of from the memory for vehicle status 18. In addition, the judgement criteria in steps S5 to S7 of FIG. 3 may be changed according to a difference in the priority. For example, if the difference in the priority between the stations B and C is large, pick-up at the station B may be prioritized by lowly valuing the possibility of interference. If the difference is the priority is small, the possibility of interference may be highly valued.

Control described in the present preferred embodiment of the present invention can be extended to dropping off the articles at the stations A, B, C, for example. In this regard, the article may be dropped off at any of the stations A, B, C, and the priority towards the stations A, B, C is not taken into consideration. In this case, if drop-off will not interfere with the subsequent transport vehicles, the transport vehicle controller 10 issues a command to drop off the article equally at each station or drop off the article by placing priority on the station on the upstream side. If there would be interference, it issues a command to drop off the article by placing priority on the station on the downstream side.

The present preferred embodiment of the present invention includes inquiries made by the transport vehicle controller 10 and reports made by the transport vehicles a, b, c.

However, the transport vehicles a, b, c, or the like can periodically report the position, speed, and status to the transport vehicle controller 10, for example. In this case, the transport vehicle controller 10 can skip making inquiries and determine the presence of interference based on the reports made by the transport vehicles, such that the transport vehicle controller 10 can issue a command to the transport vehicles a, b, c regarding the position where pick-up should be carried out, similarly to the present preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transport vehicle system comprising:
at least one circulating route;
a plurality of transport vehicles that travel in one direction along the at least one circulating route;
a plurality of transfer points along the at least one circulating route, where an article is transferred between the plurality of transport vehicles; and
a transport vehicle controller configured or programmed to control the travel of the plurality of transport vehicles; wherein
when pick-up requests to pick up articles are made from the plurality of transfer points within the at least one circulating route, and a priority is specified for each of the pick-up requests, the transport vehicle controller is configured or programmed to:
assign commands to the plurality of transport vehicles to travel to a predetermined point on an upstream side of the plurality of transfer points according to a number of the plurality of transfer points where the articles are to be picked up;
when a first transport vehicle included in the plurality of transport vehicles passes through the predetermined point, determine whether or not picking up the article at a high-priority transfer point included in the plurality of transfer points by the first transport vehicle would slow down or stop others of the plurality of transport vehicles which pick up the articles at the transfer points on a downstream side of the at least one circulating route, according to states of the others of the plurality of transport vehicles;
issue a command to the first transport vehicle to travel to, and pick up an article from, a transfer point on the downstream side of the at least one circulating route if the others of the plurality of transport vehicles would be slowed down or stopped if the first transport vehicle were to pick up the article at the high-priority transfer point; and
issue a command to the first transport vehicle to travel to, and pick up an article from, the high-priority transfer point if the others of the plurality of transport vehicles will not be slowed down or stopped if the first transport vehicle picks up the article at the high-priority transfer point.

2. The transport vehicle system according to claim 1, wherein the transport vehicle controller is configured or programmed to determine whether or not the others of the plurality of transport vehicles would be slowed down or stopped based on the speed of the other transport vehicles included in the plurality of transport vehicles.

3. The transport vehicle system according to claim 1, wherein the transport vehicle controller is configured or programmed to determine whether or not the others of the plurality of transport vehicles would be slowed down or stopped based on the positions of the other transport vehicles included in the plurality of transport vehicles.

4. The transport vehicle system according to claim 1, wherein the first transport vehicle is an overhead travelling vehicle and travels according to the command issued by the transport vehicle controller;
the at least one circulating route is provided underneath a ceiling of a building and includes a plurality of circulating routes which include an inter-bay route and a plurality of intra-bay routes connected to the inter-bay route; and
the first transport vehicle picks up the article from a designated transfer point included in the plurality of transfer points according to the command issued by the transport vehicle controller and then travels from the intra-bay route which includes the designated transfer point from which the article is picked up to the intra-bay route which includes a transfer point to which the article is dropped off, via the inter-bay route.

5. The transport vehicle system according to claim 4, wherein the predetermined point is provided at an entrance to the intra-bay route; and
the at least one circulating route includes the intra-bay route and the inter-bay route.

6. The transport vehicle system according to claim 4, wherein the transport vehicle controller is configured or programmed to issue the command when the first transport vehicle passes through the predetermined point, without stopping or slowing down the first transport vehicle.

7. The transport vehicle system according to claim 6, wherein the transport vehicle controller is configured or programmed to designate the designated transfer point where the article is to be picked up and issue a command to travel to the designated transfer point, when the other transport vehicles pass through the predetermined point.

8. The transport vehicle system according to claim 7, wherein
when a pick-up request for picking up an article is made from a new transfer point within the at least one circulating route by specifying the priority after having issued the command of the designated transfer point where the article is to be picked up to the first transport vehicle, the transport vehicle controller is configured or programmed to:
assign a command to a new transport vehicle to travel to the predetermined point;
for a group of transfer points which include transfer points within the at least one circulating route where requests for picking up the articles are made and the new transfer point, and a group of transport vehicles which include the other transport vehicles and the new transport vehicle;
when a new first transport vehicle in the group of transport vehicles passes through the predetermined point, determine whether or not picking up the article at a new high-priority transfer point in the group of transfer points by the new first transport vehicle in the group of transport vehicles would slow down or stop the other transport vehicles in the group of transport vehicles that pick up the articles at the transfer points on the downstream side of the at least one circulating route, according to the states of the other transport vehicles in the group of transport vehicles;

issue a command to the new first transport vehicle in the group of transport vehicles to travel to, and pick up the article from, the transfer point on the downstream side if the other transport vehicles in the group of transport vehicles would be slowed down or stopped if the new first transport vehicle were to pick up the article at the new high-priority transfer point in the group of transfer points; and issue a command to the new first transport vehicle in the group of transport vehicles to travel to, and pick up the article from, the new high-priority transfer point in the group of transfer points if the other transport vehicles in the group of transport vehicles will not be slowed down or stopped if the new first transport vehicle picks up the article at the new high-priority transfer point in the group of transfer points.

9. A transport method performed by a transport vehicle system including:

at least one circulating route;

a plurality of transport vehicles that travel in one direction along the at least one circulating route;

a plurality of transfer points along the at least one circulating route, where an article is transferred between the plurality of transport vehicles; and a transport vehicle controller configured or programmed to control the travel of the plurality of transport vehicles;

when pick-up requests for picking up articles are made from the plurality of transfer points within the at least one circulating route and the priority is specified for each of the pick-up requests, the transport vehicle controller performs the steps including:

assigning commands to the plurality of transport vehicles to travel to a predetermined point on an upstream side of the plurality of transfer points according to a number of the plurality of transfer points where the articles are to be picked up;

when the first transport vehicle among the plurality of transport vehicles passes through the predetermined point, determining whether or not picking up the article at a high-priority transfer point included in the plurality of transfer points by the first transport vehicle would slow down or stop other transport vehicles among the plurality of transport vehicles, which pick up the articles at the transfer points on a downstream side of the at least one circulating route, according to states of others of the plurality of transport vehicles;

issuing a command to the first transport vehicle to travel to, and pick up the article from, a transfer point on the downstream side of the at least one circulating route if the other transport vehicles would be slowed down or stopped if the first transport vehicle were to pick up the article at the high-priority transfer point; and issuing a command to the first transport vehicle to travel to, and pick up the article from, the high-priority transfer point if the other transport vehicles will not be slowed down or stopped if the first transport vehicle picks up the article at the high-priority transfer point.

* * * * *